3,033,818
PRODUCTION OF MIXED DIGLYCIDYL ETHER COMPOSITIONS
Herbert P. Price and William J. Belanger, Louisville, Ky., assignors to Devoe & Raynolds Company, Inc., Louisville, Ky., a corporation of New York
No Drawing. Filed Oct. 24, 1958, Ser. No. 769,284
5 Claims. (Cl. 260—47)

This invention relates to improvements in the production of mixed glycidyl ethers, etc., and includes new processes of producing such ethers and improved compositions resulting therefrom.

According to the present invention, monochlorohydrin ethers of hydroxyalkyl and hydroxy-aliphatic ethers of dihydric phenols are admixed with a polyhydric phenol or with a chlorohydrin ether of a polyhydric phenol and with an excess of epichlorohydrin and subjected to dehydrohalogenation with an alkaline dehydrohalogenating agent to produce a composition made up mainly or largely of mixed diglycidyl ethers. The amount of epichlorohydrin is in sufficient excess to serve as a solvent, or as a solvent and reaction medium. The amount of alkaline dehydrohalogenating agent used is sufficient to effect dehydrohalogenation of the chlorohydrin ethers and also to bring about reaction of part of the epichlorohydrin with the polyhydric phenol when used to produce glycidyl ethers thereof.

In our companion application entitled "Production of Diglycidyl Ethers," application Serial No. 769,317, filed October 24, 1958, we have described the production of aliphatic-aromatic glycidyl ethers by first forming monochlorohydrin ethers of hydroxyalkyl or hydroxyaliphatic ethers of dihydric phenols and subjecting them to dehydrohalogenation with an alkaline dehydrohalogenating agent in the presence of an excess of epichlorohydrin as a solvent and reaction medium to produce mainly or largely monomeric aliphatic-aromatic diglycidyl ethers.

The process of the present invention is a modification of and improvement upon the process of said companion application, in which polyhydric phenols, and particularly dihydric phenols, or chlorohydrin ethers of such phenols, or mixtures of such dihydric phenols and chlorohydrin ethers thereof, are admixed with the monochlorohydrin ethers of the hydroxyalkyl or hydroxy-aliphatic ethers of dihydric phenols to produce, on dehydrohalogenation, composite glycidyl ethers which are in part aliphatic-aromatic glycidyl ethers such as produced by the process of said companion application and in part glycidyl ethers of the polyhydric phenols.

The hydroxyalkyl or hydroxy-aliphatic ethers of dihydric phenols, from which the chlorohydrin ethers are prepared, can be readily prepared by reacting 1 mol of dihydric phenol with 1 mol of a simple or substituted alkyl or aliphatic chlorohydrin, using sodium hydroxide as the condensing or dehydrohalogenating agent; or by reacting 1 mol of dihydric phenol with 1 mol of a simple or substituted alkyl or aliphatic carbonate using potassium carbonate as the catalyst; or by reacting 1 mol of dihydric phenol with 1 mol of a simple or substituted aliphatic monoepoxide.

The formation of the hydroxyalkyl or hydroxyaliphatic ethers of a dihydric phenol is illustrated by the following equation, in which R is the aromatic nucleus of the dihydric phenol and R' is the radical of the simple or substituted alkyl group, including alkylether substituted alkyl groups, and which may be defined as a simple or substituted aliphatic divalent radical containing at least 2 carbon atoms selected from the group consisting of aliphatic hydrocarbon groups, hydroxy-substituted aliphatic hydrocarbon groups, hydrocarbon-ether-substituted aliphatic hydrocarbon groups, and hydroxy-substituted hydrocarbon ethers of aliphatic hydrocarbon groups:

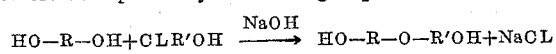

Examples of the hydroxyalkyl ethers are the hydroxyethyl ether of the dihydric phenol, such as bisphenol, in which R' is the —CH$_2$CH$_2$— group, which can readily be prepared by the reaction of ethylene chlorohydrin with dihydric phenol with the use of caustic soda as the dehydrohalogenating agent. The use of glyceryl monochlorohydrin gives a hydroxy alkylether in which R' is the

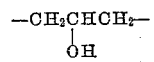

group, this being the dihydroxypropyl ether of the dihydric phenol.

In a similar manner, the use of other aliphtic chlorohydrins can be used to give other hydroxyalkyl or substituted hydroxyalkyl ethers of the dihydric phenols.

The dihydroxypropyl ether of the dihydric phenol can also be prepared by reacting 1 mol of the dihydric phenol with 1 mol of glycidol. And other monoepoxides can be similarly used to produce other hydroxyalkyl and substituted hydroxyalkyl derivatives. Thus, the use of phenylglycide ether for reacting with the dihydric phenol gives a product in which the group R' in the above formula is

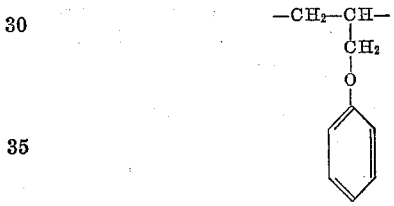

In this case, the alkyl group has a hydrocarbon ether substituent. Other simple or substituted hydroxyalkyl derivatives can be produced by the use of other monoepoxides such as ethylene oxide, butylglycidyl ether, isopropylglycidyl ether, styrene, oxide, etc.

In addition to the simple and substituted hydroxyalkyl ethers, substituted in the alkyl group, somewhat more complex hydroxyalkyl or hydroxy-aliphatic derivatives of the dihydric phenols can be produced by reacting 1 mol of the dihydric phenol with the monochlorohydrin ether of a mono-, di-, or trihydric alcohol, or by reacting 1 mol of the dihydric phenol with 1 mol of a monoglycide ether such as the monoglycide ethers of di-, tri-, or higher polyhydric alcohols. For example, 1 mol of the monoglycide ether of trimethylol propane can be reacted with 1 mol of a dihydric phenol such as bisphenol to form the corresponding hydroxy-containing monoether. Or 1 mol of the monochlorohydrin ether of trimethylol propane can be reacted with 1 mol of a dihydric phenol such as bisphenol to form the hydroxy-containing monoether. The resulting hydroxyalkyl or hydroxy-aliphatic ether of the dihydric phenol in this case will have a formula in which R' is the following group:

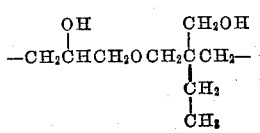

The hydroxylalkyl or hydroxy-aliphatic ethers of the dihydric phenols have both alcoholic hydroxyl and phenolic hydroxyl groups.

The monochlorohydrin ethers are produced by reacting 1 mol of the hydroxyalkyl ether or of the hydroxy-aliphatic ether of the dihydric phenol with 1 mol of epichlorohydrin in the presence of a condensation catalyst, and particularly a BF₃ catalyst such as a boron trifluoride ether complex or etherate, to form the chlorohydrin ether. This reaction of epichlorohydrin is with the alcoholic hydroxyl group, or with one of the alcoholic hydroxyl groups, leaving the phenolic hydroxyl group largely unreacted. This reaction is illustrated by the following equation, in which R and R' have the same meaning above indicated:

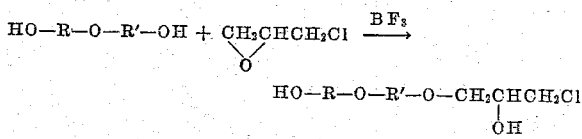

The further reaction of the monochlorohydrin ether, produced as above described, is a reaction in which a dihydric phenol, or a chlorohydrin ether of a dihydric phenol, is added to the chlorohydrin ether together with an excess of epichlorohydrin as a solvent and reaction medium, and this reaction is a dehydrohalogenating reaction in the presence if an alkaline dehydrohalogenating agent. This reaction is a reaction in which the phenolic hydroxyl of the monochlorohydrin ether reacts with the epichlorohydrin at the same time that the chlorohydrin group of the chlorohydrin ether is dehydrohalogenated, and at the same time as the phenolic hydroxyls of the added dihydric phenol, when used, react with the epichlorohydrin, or in which the chlorohydrin ether of the dihydric phenol, when used, is also dehydrohalogenated. The result of these reactions is the production of a composite product made up largely of monomeric diglycide ethers such as the diglycide ether of the dihydric phenol and the diglycidyl ether produced from the monochlorohydrin ether, as illustrated by the following equation:

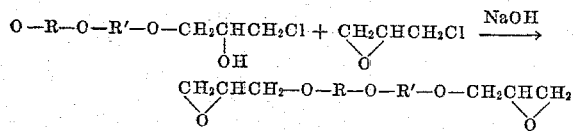

The process will be first described in connection with the addition of a dihydric phenol to the monochlorohydrin ether, and the monochlorohydrin ethers will be illustrated by the chlorohydrin ethers of unsubstituted and substituted alkyl ethers of dihydric phenols.

The hydroxyalkyl ethers of dihydric phenols have both an alcoholic hydroxyl group and a phenolic hydroxyl group. The reaction of the epichlorohydrin with the aid of a BF₃ catalyst is with an alcoholic hydroxyl group, while the subsequent reaction of epichlorohydrin in the presence of caustic alkali is with the phenolic hydroxyl group. There is thus produced a diglycidyl aliphatic-aromatic ether with one glycidyl ether group united to the aromatic residue of the phenol, and the other united to the alkyl ether group.

The reaction of a part of the epichlorohydrin with the dihydric phenol in the presence of the alkaline dehydrohalogenating agent forms mainly or largely a diglycide ether of the dihydric phenol.

The above reactions take place in the same reaction mixture and, in addition to the production of the diglycide ethers represented by the above formulas, somewhat more complex reactions may take place to form small or varying amounts of more complex reaction products.

It is one advantage of the use of an excess of epichlorohydrin as the solvent that it enables the diglycide ethers to be produced largely in a monomeric state and with a limited or regulated amount of further reaction or condensation or polymerization during the dehydrohalogenation.

If the process is considered as starting with the monohydroxyalkyl ether of the dihydric phenol, which has both an alcoholic hydroxyl group and a phenolic hydroxyl group, the first step is one of reaction of the alcoholic hydroxyl group with epichlorohydrin with the use of a condensation catalyst, such as a boron trifluoride ether complex or etherate. This reaction is an addition reaction between the epoxy group of the epichlorohydrin and the alcoholic hydroxyl group. In this reaction, no excess of epichlorohydrin is necessary and all or substantially all of the epichlorohydrin initially added is caused to react with the alcoholic hydroxyl group.

After the formation of the monochlorohydrin ether, the boron fluoride catalyst is killed or deactivated by the use of minute amounts of alkali and water.

In the next step of the process, the monochlorohydrin ether produced as above described is admixed with a dihydric phenol and with an excess of epichlorohydrin, and dehydrohalogenation is effected by the action of an alkaline dehydrohalogenating agent, and particularly caustic soda, used in amount sufficient to effect dehydrohalogenation of the chlorohydrin group of the chlorohydrin ether and also to effect reaction of part of the epichlorohydrin with the phenolic hydroxyl of the chlorohydrin ether and with the hydroxyls of the dihydric phenol.

In carrying out this main step of the process, a considerable excess of epichlorohydrin is used and acts as a solvent and reaction medium, in addition to the part or amount that reacts with the phenolic hydroxyls. The excess of epichlorohydrin used in this step is at least 1 mol of epichlorohydrin for each mol of the chlorohydrin ether and of the epichlorohydrin which reacts; and advantageously a much larger proportion of epichlorohydrin is used, e.g., up to around 6 or 10 or even 20 mols of epichlorohydrin.

Different alkaline dehydrohalogenating agents can be used, including alkali metal complexes and salts such as sodium silicate, sodium aluminate, sodium zincate, etc., but it is one advantage of the process, in which epichlorohydrin is used as a solvent or diluent, that caustic alkali can be used for the dehydrohalogenation without objectionable further reaction, or with a minimum of further reaction during and after the formation of the diglycidyl ethers.

Different unsubstituted and substituted hydroxyalkyl ethers of dihydric phenols can be used in making the monochlorohydrin ethers and the final diglycidyl ethers, varying both in the dihydric phenol used and in the hydroxyalkyl or hydroxy-aliphatic ether groups, as previously indicated. The hydroxyethyl ethers of dihydric phenols such as bisphenol are particularly advantageous; but higher mono- or polyhydroxyalkyl ethers can be used, such as the hydroxypropyl and hydroxybutyl ethers, and including substituted as well as unsubstituted hydroxyalkyl and hydroxy-aliphatic ethers.

Different dihydric phenols can be used in the hydroxyalkyl and hydroxy-aliphatic ethers, including dihydric phenols such as are used with epichlorohydrin in the presence of caustic alkali for producing epoxy resins, including resorcinol, hydroquinone, bisphenol (p,p'-dihydroxy diphenyl dimethyl methane), etc.

In the chlorohydrin ethers which are formed in the manner above described, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1) 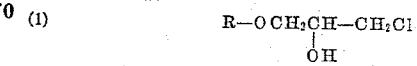

This compound is easily dehydrohalogenated to give an epoxide compound.

Inactive chlorines are formed by the addition of epichlorohydrin to the hydroxyl group in the above compound.

(2) 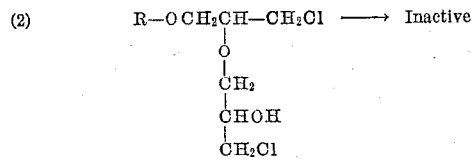 → Inactive

The above labeled chlorine cannot be removed to form an epoxide group since no hydroxyl is present on an adjacent carbon.

The invention will be further illustrated by the following examples and more detailed description, but it will be understood that the invention is not limited thereto.

Examples 1 and 2 illustrate the production of the monohydroxyethyl ether of bisphenol by two different processes.

Example 1

To a five liter flask equipped with a condenser, stirrer, and thermometer, was added 1140 grams (5 mols) of bisphenol, 210 grams sodium hydroxide (5 mols+5 wt. percent excess) and 1.5 liters of water. After the bisphenol and sodium hydroxide were dissolved, 407.5 grams (5 mols+1.25 wt. percent excess) of ethylene chlorohydrin was added. The solution was heated to reflux and held there for one hour. On cooling, the product was washed with hot water until neutral to remove the sodium chloride and other water solubles. The water was then removed by heating the material to 160° C. under 29 mm. pressure. The product analyzed 12.55% OH (theoretical 12.5%) in 100% yield (1367 grams).

Example 2

To the same equipment as described in Example 1, 228 grams bisphenol (1 mol) and 93 grams of ethylene carbonate (1 mol+5 wt. percent excess) were added. The mixture was heated to 130° C. to dissolve the bisphenol. Potassium carbonate, 2 grams, was added. The temperature was raised over a period of two hours to 200° C. The product was cooled and reheated to 150° C. under 70 mm. pressure. The product analyzed 12.65% OH in 100% yield (274 grams).

The compounds of Examples 1 and 2 were dark amber colored amorphous materials that were very viscous liquids at room temperature.

The hydroxyethyl ethers of resorcinol are prepared in a similar manner and are dark, viscous, amorphous liquids at room temperature.

The hydroxyethyl ethers of other dihydric phenols such as hydroquinone, 4,4'-dihydroxy diphenyl sulfone, etc. may be similarly prepared.

Other hydroxyalkyl ethers of dihydric phenols are illustrated by the following examples:

Example 3

To a two liter flask equipped with a mechanical stirrer, thermometer and condenser was added three mols of bisphenol (684 grams), three mols of isopropyl glycidyl ether (348 grams) and one gram of $K_2CO_3$. Heat was applied and the temperature was slowly raised to 150° C. over a period of one hour. When the heat source was removed, the temperature rose to 170° C. in 15 minutes. At this point, the temperature began to fall so heat was applied to 200° C. in thirty minutes. The material was then poured into a can to cool. The product in 100% yield analyzed at 9.9% hydroxyl (theoretical percent OH=9.9).

Example 4

To a two liter flask equipped as in Example 3 was added five moles of resorcinol (550 grams), and five mols of glycerine carbonate (590 grams). The mixture was heated to 130° C. where two grams $K_2CO_3$ was added. The temperature was raised to 190–200° C. and held there for three hours. At the end of this time, gas evolution was very small. The apparatus was then evacuated to 150 mm. pressure and held at this pressure and 190–200° C. for two hours. The product in 99% yield (912 grams) contained 27.0% OH (theoretical, 27.7%).

The reaction of the hydroxyalkyl ethers of dihydric phenols with epichlorohydrin in the presence of a $BF_3$ catalyst to form the monochlorohydrin derivative, is illustrated by the following examples:

Example 5

To a one liter flask equipped with condenser, stirrer, thermometer and addition tube was added 408 grams of the monohydroxyethyl ether of bisphenol (1.5 mols) and 1 cc. of $BF_3$ etherate. The temperature was raised to 43° C. where dropwise addition of epichlorohydrin was begun. The epichlorohydrin (139 grams, 1.5 mols) was added over a period of forty minutes, the temperature being controlled between 70–80° C. by external cooling. The product contained 8.0% active chlorine, 9.8% total chlorine.

Example 6

By a similar procedure, the monohydroxyethyl ether of resorcinol was converted into a monochlorohydrin ether containing 12.0% active chlorine and 14.0% total chlorine.

Example 7

The glycerine ether of resorcinol was treated in a similar way and gave a chlorohydrin ether with 10.1% active chlorine and 12.8% total chlorine.

The following example illustrates the production of the monochlorohydrin ether of the isopropyl glycidyl ether adduct of bisphenol, together with the subsequent admixture with a dihydric phenol and an excess of epichlorohydrin and dehydrohalogenation to form the new products.

Example 8

To a one liter flask equipped with condenser, stirrer, thermometer and addition tube was weighed 344 grams (1 mol) of the reaction product of Example 3. Heat was applied and at 40° C., dropwise addition of epichlorohydrin was begun followed by 1 cc. of $BF_3$ etherate. All the epichlorohydrin, 92.5 g. (1 mol), was added in thirty minutes, the temperature being controlled below 62° C. by external cooling. Ten minutes after the final epichlorohydrin addition, the reaction was complete as evidenced by the drop in temperature. This material contained 6.5% active chlorine, 8.1% total chlorine.

To a two liter flask equipped with stirrer, condenser and thermometer was added 180 grams of the above chlorohydrin and 1 gram of NaOH in 5 cc. of $H_2O$ to complex the $BF_3$ catalyst. To this was added 126 grams of bisphenol and 855 grams epichlorohydrin. (126 grams of bisphenol will yield, theoretically, 188 grams of the diglycidyl ether. 180 grams of the chlorohydrin ether of the adduct will yield, theoretically, 188 grams of the diglycidyl ether.) After solution was attained 85 grams of NaOH (equivalence+10 wt. percent excess) was added in three increments over a half hour period. The exothermic reaction was controlled below 100° C. by external cooling. After the final exotherm, the heat was applied to a pot temperature of 128° C. to remove the water-epichlorohydrin azeotrope. Upon cooling, salts were removed by vacuum filtration and the solvents were removed under 116 mm. to 160° C. The product, 390 grams (97.5% yield), had a wt./e. of 230 (theoretical 195), active chlorine content 1.0%, total chlorine 2.1% Gardner viscosity $Z_3$–$Z_4$.

The following examples further illustrate the admixture of the monochlorohydrin ethers with dihydric phenols and an excess of epichlorohydrin and dehydrohalogenation with an alkaline dehydrohalogenating agent to produce the new products.

Example 9

By a similar procedure to that of Example 8, 114 g. of the monochlorohydrin ether of the hydroxy ethyl ether of bisphenol having 8.0% active chlorine and 9.8% total chlorine, 188 g. of bisphenol, 1022 g. epichlorohydrin and 100 g. NaOH were reacted to give a product with a weight per epoxide of 207 (theoretical 176), 0.5% active chlorine, 1.0% total chlorine and a Gardner viscosity of $Z_5$–$Z_6$.

Example 10

In a similar manner the following were reacted, 205 g. of the monochlorohydrin ether of the hydroxyethyl ether of resorcinol having a percent active chlorine of 12.0 and a total chlorine of 14.4, 17 g. bisphenol, 599 g. epichlorohydrin and 80 g. NaOH.

The epoxide resin produced had a weight per epoxide of 195 (theoretical 137), 1.3% active chlorine, 4.3% total chlorine, and a Gardner viscosity of W–Y.

Example 11

In a similar way, the following was reacted, 196 g. of the monochlorohydrin ether of the glycerine ether of resorcinol having 10.1% active chlorine and 12.8% total chlorine, 47 g. resorcinol, 985 g. epichlorohydrin and 100 g. NaOH. The epoxy resin obtained had a weight per epoxide of 188 (theoretical 135), 0.8% active chlorine, 2.8% total chlorine, and a Gardner viscosity of $Z_6$.

In a similar manner, other hydroxyalkyl and hydroxyaliphatic ethers of dihydric phenols, such as those hereinbefore referred to and illustrated by the general formula hereinbefore referred to, can be prepared and reacted with epichlorohydrin to give the monochlorohydrin ethers, admixed with a dihydric phenol and an excess of epichlorohydrin, and subjected to dehydrohalogenation to give composite products which are largely diglycide ethers or somewhat more complex reaction products thereof and including diglycide ethers of dihydric phenols and also aliphatic-aromatic diglycidyl ethers with the glycidyl group at one end of the molecule united to the phenolic residue and at the other end of the molecule to an aliphatic residue.

The preceding detailed description and examples illustrate the process in which dihydric phenols are added to the monochlorohydrin ethers of hydroxyalkyl and hydroxyaliphatic ethers of the dihydric phenols.

An alternative or modified process is one in which the dihydric phenol is replaced, in whole or in part, with chlorohydrin or glycidyl-chlorohydrin ethers of dihydric phenols which will be subjected to dehydrohalogenation in the presence of an excess of epichlorohydrin at the same time that the monochlorohydrin ethers of the hydroxyalkyl or hydroxyaliphatic ethers of dihydric phenols are subjected to dehydrohalogenation.

When such chlorohydrin ethers of dihydric phenols are used, the process has an added step in the sense that the dihydric phenols are first reacted with epichlorohydrin in the presence of a catalyst to form chlorohydrin derivatives and particularly glycidyl-chlorohydrin derivatives of the dihydric phenol; which is then added to or admixed with the monochlorohydrin ether of the hydroxyalkyl ether of the dihydric phenol, and both chlororhydrin ethers are subjected to dehydrohalogenation in the presence of an excess of epichlorohydrin.

Where the dihydric phenol is replaced only in part by the chlorohydrin ether of the dihydric phenol, the reaction will be somewhat more complex in the sense that part of the excess epichlorohydrin will react with the dihydric phenol during the dehydrohalogenation in which both of the chlorohydrin ethers are dehydrohalogenated.

Whether the dihydric phenol is used alone, with the monochlorohydrin ether, as in the preceding examples, or is replaced in whole or in part by a chlorohydrin ether of a dihydric phenol, as illustrated in the following examples, the products are composite glycidyl ether compositions containing glycidyl ethers of both the polyhydric phenol and of the hydroxyalkyl or hydroxy-aliphatic ether of the dihydric phenol.

When the dihydric phenol is replaced, in whole or in part, by the chlorohydrin ethers of dihydric phenols, similar proportions can be used of the chlorohydrin ether, or of the mixture of dihydric phenol and chlorohydrin ether, to those used when the dihydric phenol is used alone, as previously described.

The chlorohydrin ethers and glycidyl-chlorohydrin ethers of dihydric phenols can readily be prepared by reaction of a dihydric phenol in a large excess of epichlorohydrin with a basic catalyst such as benzyl trimethyl ammonium chloride (BTMACl). The epichlorohydrin reacts with the phenolic hydroxyls, forming the chlorohydrin ethers. However, as the reaction progresses, the excess epichlorohydrin acts as an acceptor for the HCl of the chlorohydrin ether groups, with the resulting formation of glyceryl dichlorohydrin and the conversion of chlorohydrin ether groups to glycidyl ether groups. An equilibrium is finally reached wherein approximately one-half of the ether groups on the dihydric phenol are glycidyl groups and approximately one-half are chlorohydrin groups, thus giving a product which is a glycidyl-chlorohydrin ether of the dihydric phenol, which can be considered in whole or in part to have the following typical formula, in which R is the hydrocarbon residue of the dihydric phenol:

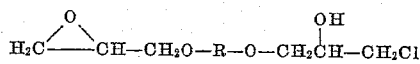

The resulting solution of the glycidyl chlorohydrin ether contains unreacted epichlorohydrin, glyceryl dichlorohydrin and mixed glycidyl-chlorohydrin ethers of dihydric phenols. Such solutions can be used in two different ways for further reaction in the process.

One method of using the solution is to use it as it is with its content of epichlorohydrin and glyceryl dichlorohydrin for addition to and admixture with the monochlorohydrin ether of the hydroxyalkyl ether of the dihydric phenol and with the addition of sufficient caustic alkali to dehydrohalogenate the glyceryl dichlorohydrin as well as the chlorohydrin ether groups of the other reactants. Since the amount of glyceryl dichlorohydrin corresponds to the glycidyl groups of the glycidyl-chlorohydrin ether of the dihydric phenol, the amount of dehydrohalogenation is much the same as if a dichlorohydrin ether of a dihydric phenol was used instead of the glycidyl-chlorohydrin ether.

The second method of using the solution of the glycidyl-chlorohydrin ether is to distill the excess epichlorohydrin and glyceryl dichlorohydrin from the mixed glycidyl-chlorohydrin ether of the dihydric phenol. In this case, the amount of caustic used for dehydrohalogenation is calculated from the chlorohydrin content of the mixed ether.

The preparation of the glycidyl chlorohydrin ether of a dihydric phenol, namely, bisphenol, is illustrated by the following example:

Example 12

To a 2 liter flask equipped with stirrer, thermometer, an reflux condenser was added 10 mols of epichlorohydrin (925 g.), 1 mol of bisphenol and 2 cc. of a 60% solution of benzyl trimethyl ammonium chloride (BTMACl) in water. This solution was heated with stirring to 110° C. where a slight exotherm was encountered. Heat was removed and the exothermic temperature was allowed to rise to 114° C. After 5 minutes when the temperature began to drop, heat was applied to raise the temperature to reflux (118–120° C. pot temperature). After 3 hours at reflux the reaction was complete.

This solution contained one mol of a diphenolic ether, consisting of approximately 50% glycidyl ether groups and 50% chlorohydrin ether groups, unreacted epichlorohydrin (7 mols) and glyceryl dichlorohydrin, equivalent to the glycidyl ether groups of the phenol (1 mol).

The mixed glycidyl-chlorohydrin ether of bisphenol produced as described in this example can be isolated as illustrated by the following example:

Example 13

The solution described in Example 12 was vaccum distilled to a pot temperature of 150° C. at 0.1–0.5 mm. Hg. The resinous product (365 g.) had a wt./e. of 323 and percent Cl of 7.3.

The following examples illustrate the use of the mixed chlorohydrin glycidyl ethers of a dihydric phenol to replace all or part of the hidydric phenol in carrying out the process of the present invention:

Example 14

To a 2 liter flask equipped with stirrer, condenser and thermometer was added 139 g. (0.38 mol) of the monochlorohydrin ether of the monohydroxyethyl monoether of bisphenol, described in Example 5, and 1 g. of NaOH dissolved in 5 cc. $H_2O$ to complex the $BF_3$ catalyst. To this was added 365 g. (1 mol) of the mixed chlorohydrin glycidyl ethers of bisphenol, described in Example 13, and 1022 g. (11.04 mols) epichlorohydrin. After solution was attained heat was applied to 70° C. and 66 g. (1.67 mols) of NaOH was added in 3 increments. After all the NaOH was added the temperature was raised to 125° C. to remove the water, epichlorohydrin azeotrope.

The reaction mixture was cooled, filtered to remove the salt and vacuum distilled to 150° C. at 25 mm. to remove the solvents. The product, 496 g., had a wt./epoxide of 206, percent total Cl=1.1, percent active Cl=0.5, Gardner viscosity $Z_{-4}$.

Example 15

To a 2 liter flask equipped as in Example 14 was added 139 g. (0.38 mol) of the monochlorohydrin ether of Example 5 and 1 g. NaOH dissolved in 5 cc. $H_2O$ to complex the $BF_3$ catalyst. To this was added 1155 g. of the dichlorohydrin ether of bisphenol solution equivalent to 1 mol of dichlorohydrin ether of bisphenol+8 mols of epichlorohydrin. Epichlorohydrin, 232 g. (2.5 mols) was added. After dissolution the solution was heated to 70° C. where 120 g. (3 mols) NaOH was added in 4 increments. After all the NaOH had reacted the temperature was raised to 125° C. to distill the water, epichlorohydrin azeotrope.

The mixture was cooled, filtered to remove the salt, and distilled to 150° C. at 28 mm. to remove the solvents. The product (489 g.) had a wt./epoxide of 201, percent total Cl=1.0, percent active C=0.6, and Gardner viscosity $Z_{-4}$.

Example 16

To a 2 liter flask equipped as in Example 14 was added 326 g. (0.745 mol) of the monochlorohydrin ether of the reaction product of Example 3 and 1 g. NaOH dissolved in 5 cc. $H_2O$ to complex the catalyst. To this was added 114 g. (0.5 mol) of bisphenol and 182.5 g. (0.5 mol) of the mixed glycidyl ether-chlorohydrin ether of bisphenol (Example 13). The mixture was dissolved in 1290 g. (13.92 mols) of epichlorohydrin and reacted with 127 g. (3.18 mols) NaOH. After workup the product (691 g.) had a wt./epoxide of 225, percent total Cl=2.0, percent active Cl=0.8, Gardner viscosity $Z_3$.

Example 17

To a 2 liter flask equipped as in Example 14 was added 326 g. (0.745 mol) of the monochlorohydrin ether of the reaction product of Example 3 and 1 g. NaOH dissolved in 5 cc. $H_2O$ to complex the catalyst. To this was added 114 g. (0.5 mol) bisphenol and 577 g. of the dichlorohydrin ether of bisphenol solution (Example 12) (eqivalent to 0.5 mol of dichlorohydrin ether of bisphenol and 4 mols epichlorohydrin) and 896 g. (9.7 mols) epichlorohydrin. After solution was reached 156 g. (3.9 mols) NaOH was added.

After this reaction and after workup, the product (690 g.) was found to have a wt./epoxide of 224, percent total Cl=1.9, percent active Cl=0.9, Gardner viscosity $Z_3$.

The composite or mixed diglycidyl ethers of the present invention are valuable epoxide resins and are useful for much the same purposes as epoxy resins produced from dihydric phenols and epichlorohydrin. They are, however, distinguished from such resins by their composite character and by their special content of the aliphatic-aromatic diglycide ethers which contain the glycidyl group joined in part to aromatic residues and in part to aliphatic residues.

The new composite products can be cured with amines such as are used for curing epoxide resins, e.g., with amines such as diethylene triamine, or with other curing or cross-linking agents.

The new products have the advantage, when cured, of incorporating aliphatic as well as aromatic constituents, and for many purposes are more advantageously used for this reason.

We claim:

1. The method of producing mixed diglycidyl ethers, which comprises subjecting hydroxy-aliphatic ethers of a dihydric phenol having the following general formula:

HO—R—O—R'—OH in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups and hydroxy-substituted hydrocarbon ethers of aliphatic hydrocarbon groups, to reaction with epichlorohydrin in the presence of a condensation catalyst to produce the monochlorohydrin ether of the hydroxy-aliphatic ether of the dihydric phenol, admixing such ether with a polyhydric phenol and with an excess of epichlorohydrin, and subjecting the mixture to dehydrohalogenation with an alkaline dehydrohalogenating agent, said excess of epichlorohydrin serving as a solvent and reaction medium, and being in an amount equivalent to at least one mole of epichlorohydrin for each mole of epichlorohydrin residue present in the resultant mixed diglycidyl ethers, and the alkaline dehydrohalogenating agent being used in amount sufficient to dehydrohalogenate the chlorohydrin group of the chlorohydrin ether and to effect reaction of part of the epichlorohydrin with the phenolic hydroxyl of the chlorohydrin ether and of the polyhydric phenol.

2. The method of producing mixed diglycidyl ethers, which comprises subjecting a monohydroxy ethyl ether of a dihydric phenol, coming within the formula of claim 1, to reaction with epichlorohydrin in the presence of a condensation catalyst to produce a monochlorohydrin ether of the hydroxyl ethyl ether of the dihydric phenol, admixing such ether with polyhydric phenol and with an excess of epichlorohydrin, and subjecting the mixture to dehydrohalogenation with an alkaline dehydrohalogenating agent, said excess of epichlorohydrin serving as a solvent and reaction medium, and being in an amount equivalent to at least one mole of epichlorohydrin for each mole of epichlorohydrin residue present in the resultant mixed diglycidyl ethers, and the alkaline dehydrohalogenating agent being used in amount sufficient to dehydrohalogenate the chlorohydrin group of the chlorohydrin ether and to effect reaction of part of the epichlorohydrin with the phenolic hydroxyl of the chlorohydrin ether and of the polyhydric phenol.

3. The method of producing mixed diglycidyl ethers from monochlorohydrin ethers of hydroxyaliphatic ethers of a dihydric phenol having the following general formula

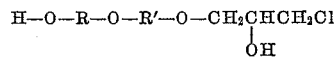

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, which comprises admixing such ethers with dihydric phenol and with an excess of epichlorohydrin, said excess epichlorohydrin being in an amount equivalent to at least one mole of epichlorohydrin for each mole of epichlorohydrin residue present in the resultant mixed diglycidyl ethers, and subjecting the mixture to dehydrohalogenation with an alkaline dehydrohalogenating agent in amount sufficient to dehydrohalogenate the said monochlorohydrin ether and to cause part of the excess epichlorohydrin to react with the phenolic hydroxyl of said ether and of the dihydric phenol.

4. A mixture of diglycidyl ethers including a diglycidyl ether of a dihydric phenol and an aliphatic-aromatic diglycidyl ether made up essentially of monomeric products of the following formula, in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups:

$$CH_2CHCH_2-O-R-O-R'-O-CH_2CHCH_2$$
$$\underset{O}{\diagdown\diagup} \qquad \underset{O}{\diagdown\diagup}$$

5. A mixture of diglycidyl ethers comprising diglycidyl ethers of polyhydric phenols and aliphatic-aromatic diglycidyl ethers of monohydroxalkyl ethers of dihydric phenols containing at least 2 carbon atoms in the alkyl group and having one glycidyl group attached through an ether oxygen linkage to the phenolic residue and one attached through an ether oxygen linkage to the alkyl residue.

References Cited in the file of this patent
UNITED STATES PATENTS
2,581,464    Zech _____ Jan. 8, 1952

UNITED STATES PATENT OFFICE
CERTIFICATE OF CORRECTION

Patent No. 3,033,818

May 8, 1962

Herbert P. Price et al.

It is hereby certified that error appears in the above numbered patent requiring correction and that the said Letters Patent should read as corrected below.

Column 3, line 40, left-hand portion of the equation, for "O-R-O-R'-O-" read -- HO-R-O-R'-O- --; column 5, line 38, for "130% C." read -- 130° C. --; column 9, line 13, for "hidydric" read -- dihydric --; lines 49 to 51, for "201, percent total Cl=1.0, percent active C=0.6, and Gardner viscosity $Z_{-4}$" read -- 201, % T.Cl=1.0, % A.Cl=0.6, and Gardner Viscosity $Z_{-4}$ --; column 12, line 12, for "monohydroxalkyl" read -- monohydroxyalkyl --.

Signed and sealed this 11th day of September 1962.

(SEAL)
Attest:

ERNEST W. SWIDER
Attesting Officer

DAVID L. LADD
Commissioner of Patents